Oct. 2, 1945.    E. M. McELHINNEY    2,386,053
COUPLING DEVICE
Filed Sept. 6, 1943
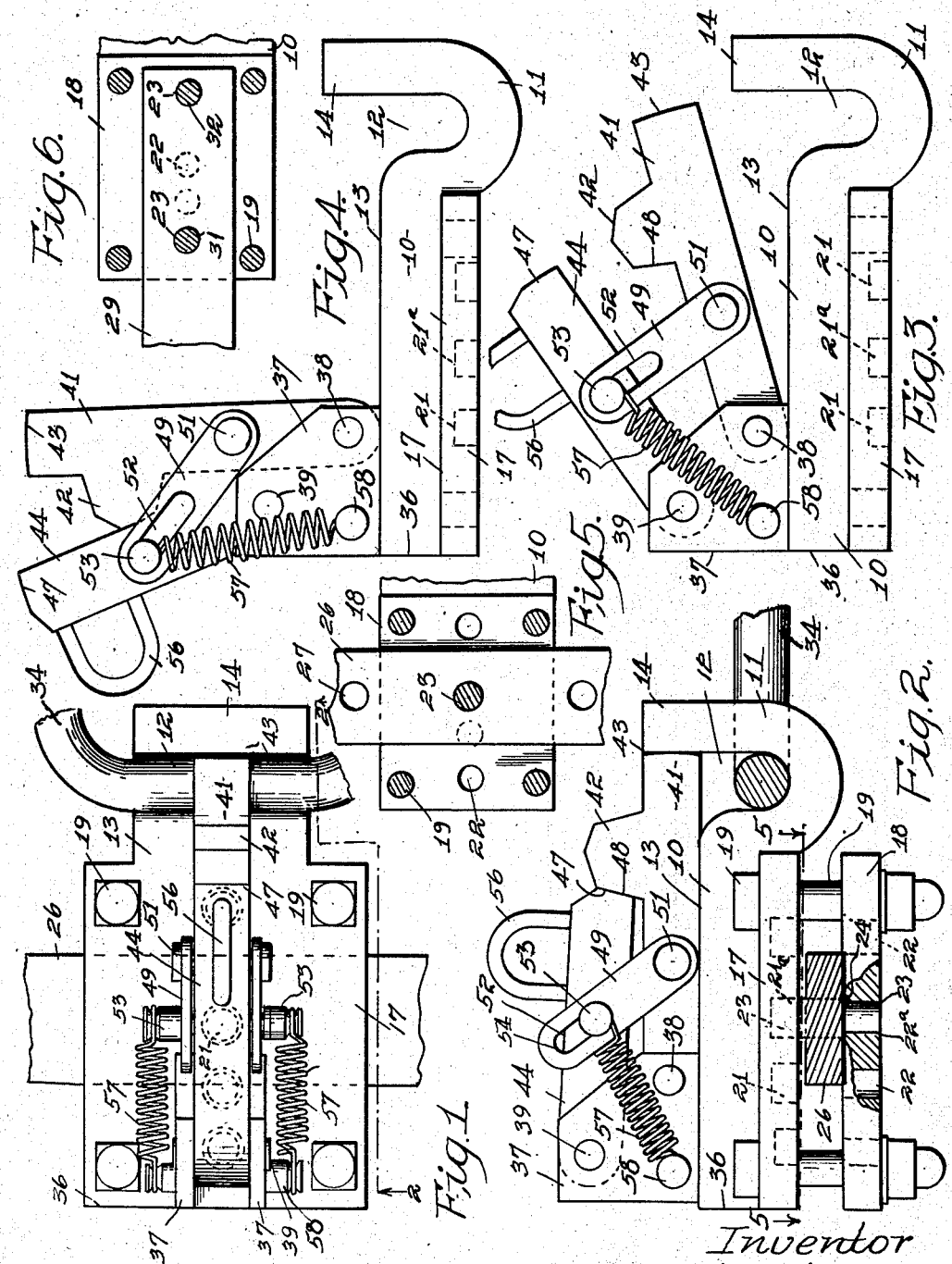
Inventor
Eric M. McElhinney
by Rudolph L. Lowell
Attorney.

Patented Oct. 2, 1945

2,386,053

UNITED STATES PATENT OFFICE 2,386,053

COUPLING DEVICE

Eric M. McElhinney, Dysart, Iowa

Application September 6, 1943, Serial No. 501,435

4 Claims. (Cl. 280—33.15)

This invention relates generally to coupling devices and in particular to a coupling device for connecting a trailer unit with a tractor unit.

An object of this invention is to provide an improved coupling.

Another object of this invention is to provide a coupling device for a tractor unit and a trailer unit in which a hitch portion on one of such units is positively but releasably locked with a hooked portion on the other of the units.

A further object of this invention is to provide a coupling device in which a positive locking of a hitch portion in a hook and the release of the hitch from the hook is accomplished entirely by a reversible movement of an interconnected latch member and locking member.

Yet another object of this invention is to provide a coupling device in which a latch member and a locking member are relatively assembled and constructed for concurrent movement in one direction to a locking position, but movable from such locking position only after the locking member is initially moved in an opposite direction.

A feature of this invention is found in the provision of a coupling device having a body member with a hook at one end, in which a latch for closing the hook and a member for locking the latch in a hook-closing position are pivotally supported in an offset relation adjacent the other end of the body member. The latch and the lock on pivotal movement in the same direction to hook-closing and latch-locking positions, respectively, are concurrently relatively movable longitudinally and constructed with coacting engageable portions which at such positions lock the latch against pivotal movement in a reverse direction.

Another feature of this invention is found in the provision of a coupling device in which a tension means is relatively assembled with a pivoted hook-closing latch and a pivoted member for locking the latch in a hook-closing position such that the tension means is capable of alternately maintaining the pivoted member in a latch-locking position and of holding the pivoted member and latch away from a hook-closing position.

Further objects, features and advantages of this invention will become apparent from the following description when taken in connection with the accompanying drawing in which:

Fig. 1 is a plan view of the coupling of this invention showing a hitch in locked position within the coupling hook;

Fig. 2 is an elevational view of the coupling device looking in the direction of the line 2—2 in Fig. 1;

Fig. 3 is illustrated similarly to Fig. 2 showing parts thereof in changed position;

Fig. 4 is illustrated similarly to Fig. 2 showing parts of the coupling device in yet another changed position;

Fig. 5 is a sectional view taken on the line 5—5 of Fig. 2 showing the coupling connected with a transversely extended draw bar; and Fig. 6 is illustrated similarly to Fig. 5 showing the coupling connected with a longitudinally extended draw bar.

With reference to the drawing the coupling of this invention is shown in Figs. 1 and 2 as including a flat body member 10 having a transversely extended hook 11 at one end, open as indicated at 12 to one side 13 of the body member 10. The free end 14 of the hook 11 is substantially normal to the plane of the body member 10 and projects upwardly, as viewed in Fig. 2, above the level of the side 13. The member 10, opposite the side 13, carries a fixed plate member 17 which cooperates with a removable plate 18 for connecting the body member 10 with a draw bar on a tractor unit (not shown), as will be later explained.

The hook 11 is capable of receiving through its opening 12 a hitch, indicated at 34, carried on a trailer unit (not shown) which hitch is positively but releasably locked in the hook 11 by means now to be described.

The body member 10 at its end 36 opposite the hook 11, is provided with a supporting unit extended upwardly from the body member side 13 and comprised of a pair of transversely spaced plates 37 welded or otherwise suitably secured to the body member 10 (Figs. 1 and 2). Adjacent the body member 10 and inwardly from its end 36 is a pivot pin 38 extended between the plates 37. A pivot pin 39 is also extended between the plates 37 at a position above the pivot pin 38, as viewed in Fig. 2, and adjacent the body member end 36 so as to be offset both vertically and horizontally relative to the pin 38.

Pivotally supported on the pin 38 between the plates 37 is a latch bar 41 of straight form having an upstanding lug or engaging portion 42 adjacent the free end 43 of the latch. The latch is of a length such that it is pivotally movable in a clockwise direction, as viewed in Fig. 2, to a limiting position against the side 13 of the body member 10 and in substantially parallel alignment with the side 13. In this limiting position the latch 41 is in a closing position with the hook opening 12 with its end 43 located inwardly or to the left of the hook end 14 as also viewed in Fig. 2.

A bar 44 of straight form for locking the latch 41 in a hook-closing position is pivotally supported at one end between the plates 37 and on the pin 39. The bar 44 on pivotal movement in a clockwise direction, as seen in Fig. 2, is movable to a limiting position at which it is in a superposed relation with the latch 41 and with its free end 47 engageable with the side 48 of the upstanding lug 42 on the latch 41.

With the latch 41 and locking bar 44 in their relative superposed positions on the body member side 13 (Fig. 2) and with the latch intermediate the body member 10 and the bar 44, any force applied at the free end 43 of the latch tending to move the latch in a counter-clockwise direction away from a hook-closing position is transmitted through the latch lug 42 to the locking bar 44 and longitudinally of the locking bar to its pivotal support 39. This force is thus directed through the axial center of the pivoted support 39 so that there is no moment arm of the bar 44 about its pivotal support or axis 39. As a result a toggle effect is produced by which the latch 41 is positively locked in a hook-closing position by the bar 44.

In order to release the latch 41 from a hook-closing position the locking bar 44 is initially moved in a counterclockwise direction until its free end 47 is out of an engaging position with the upstanding lug 42 on the latch, at which time the latch 41 is freely movable away from a hook-closing position.

From a consideration of Figs. 2 and 4 it is seen that the latch 41 and the locking bar 44 are pivotally movable through different arcuate paths. To move the latch 41 in a predetermined relation with the locking bar 44 and in response to the manipulation of the bar 44 toward and away from a latch-locking position concurrently with a corresponding movement of the latch toward and away from a hook-closing position, the latch and bar are connected together by a lost motion mechanism including a pair of links or arms 49. The links 49 are pivotally connected at one of their corresponding ends to opposite sides of the latch 41 on a pin 51 extended transversely through the latch. Each one of the opposite corresponding ends of the links is formed with a longitudinally extended slot 52 for slidably receiving a pin 53 carried transversely of the locking bar 44. Thus on lifting the locking bar 44 from its latch-locking position shown in Fig. 2, the bar 44 is initially pivotally moved in a counter-clockwise direction independently of the latch 41 until the pin 53 engages the ends 54 of the slots 52 as shown in Fig. 3. When this engagement takes place the free end 47 of the locking bar 44 is out of an engaging position with the upstanding lug 42 on the latch 41. On a further lifting movement of the bar 44 the latch 43 is freely movable in a counter-clockwise direction together with the bar 44 by virtue of the position of the bar in a spaced relation relative to the latch 41 as is clearly shown in Fig. 3. As a result after the lost motion is taken up by the links 49 the bar 44 and the latch 41 are movable together to their hook-opening position shown in Fig. 4.

On a reverse movement of the latch and bar to a hook-closing position the latch and bar are initially moved together from their positions shown in Fig. 4 toward their positions shown in Fig. 2, the locking bar during this initial movement being slidably engageable with the latch lock 42, and with the latch 41 later dropping away from the locking bar 44 substantially to its position shown in Fig. 3. It is seen, therefore, that the latch 41 is movable to a hook-closing position prior to the movement of the bar 44 to a latch locking position. This movement of the latch and bar to their positions shown in Fig. 2 takes place by virtue of the latch and bar being relatively movable longitudinally of each other concurrently with their pivotal movement between their positions shown in Figs. 2 and 4. The lost motion means thus provides for a predetermined movement of the latch and bar to their respective hook-closing and latch-locking positions, respectively, and for the lifting of the bar 44 out of a latch-locking position prior to the movement of the latch from a hook-closing position, all in response to the manipulation of the locking bar in reverse directions. This manipulation of the locking bar is facilitated by a handle portion 56 carried at its top, as shown in Fig. 2.

The locking bar 44 is yieldably held in a latch-locking position with the lug 42 by a pair of tension springs 57 one of which is located to each side of the supporting plates 37. Each spring is connected at one end to the pin 53 in the bar 44 and at its opposite end to a pin 58 located below the pivot pin 39 and extended through the plates 37. As seen in Fig. 2 the pressure of the springs, when the bar 44 is in a latch-locking position, is applied to the right of the pivotal support 39 so that the free end 47 of the locking bar 44 is continuously urged into engagement with the latch lug 42. It is apparent, therefore, that the springs 57 are entirely free of any forces tending to move the latch away from a hook-opening position, since such forces are applied only through the locking bar to its pivotal support 39. On movement of the lock and latch to their relative positions shown in Fig. 4 the longitudinal axes of the springs 57 are moved through the pivotal support 39 so that the force of the springs is applied to the left of the pivotal support as viewed in Fig. 4, to yieldably hold the latch and lock away from a hook-closing position. The springs 57 thus function to alternately yieldably hold the bar 44 in a latch-locking position and the bar 44 and latch 41 out of a latch-locking position and a hook-closing position, respectively.

The plates 17 and 18, previously mentioned for connecting the body member 10 with a tractor unit, are of a substantially square shape having corresponding holes in each of the corners thereof for receiving connecting bolts 19. Each plate 17 and 18 is further provided with a series of holes 21 and 22, respectively, spaced longitudinally of the coupling and extended centrally of a corresponding plate 17 and 18 for receiving connecting plugs 23. The plugs 23 are of a reduced diameter at one end to fit into the holes 22 of the plate 18 and are retained between the plates, while spacing such plates laterally apart from each other, by engagement of a shoulder 24 with the plate 18.

Draw bars for tractor units are generally of two types, namely, extended either transversely or longitudinally of the tractor unit and in turn of the coupling. When a transverse draw bar 26 (Figs. 2 and 5) is used one of the longitudinally spaced holes 27 in the bar is aligned with the hole indicated as 21a, which is located substantially centrally of the plate 17 and a plug 23 is extended through the bar and into central hole 21a. The plate 18 is then placed adjacent the plate 17 with the reduced end of the plug 23 inserted within the central hole 22a in the plate 18, after which the bolts 19 are tightened to hold the plate 18 in a spaced relation with the plate 17 so that the bar 26 is loosely pivoted on the plug 23 between the plates.

In the use of a longitudinally extended draw bar 29 (Fig. 6) a pair of openings 31 and 32 in the bar are aligned with a pair of corresponding holes 21 and 22 in the plates 17 and 18, respectively, the corresponding series of holes 21 and 22 being unequally spaced so that the coupling may be readily connected to longitudinally extended bars having the holes therein spaced varying distances apart. A plug 23 is then extended through each hole 31 and 32 and positioned within and between the plates 17 and 18, the same in all respects as was explained above for the transverse bar in Figs. 2 and 5.

From a consideration of the above description it is seen that the invention provides a coupler device which is of a simple and rugged construction, comprised of a minimum number of parts and readily adapted to be applied to either longitudinally or transversely extended draw bars. A locking action of a hitch portion in a hook of the coupler is accomplished entirely by the relative construction of a latch and bar and their relative pivotal support in an offset relation such that they are movable longitudinally relative to each other during their pivotal movement in different arcuate paths to hook-opening and closing positions. Further any forces tending to release the latch from a hook-closing position are entirely counteracted by virtue of the toggle action of the bar 44 and the engagement of coacting portions on the locking bar and the hook-closing latch.

Although the invention has been described with respect to a preferred embodiment thereof it is to be understood that it is not to be so limited since modifications can be made therein which are within the full intended scope of this invention as defined by the appended claims.

I claim:

1. A coupling device including a body member having a hook portion adjacent one end open to one side of said body member adapted to receive a hitch portion therein, means for releasably locking said hitch portion in said hook portion including a pivoted latch, a pivoted locking member, means pivotally supporting said locking member and latch in an offset relation on said body member to provide for a longitudinal movement therebetween concurrently with their pivotal movement in one direction to a position at which said latch is adjacent the one side of said body member and in a hook-closing position, coacting portions on said latch and locking member engageable in said position to lock said latch against pivotal movement in an opposite direction out of said hook-closing position, tension means connected with said locking member and body member for holding said locking member in a latch-locking position, and lost motion means connecting said latch and locking member so that on pivotal movement of the locking member in said opposite direction said locking member is initially moved out of a latch-locking position to provide for a later pivotal movement of said latch from a hook-closing position, with the line of pressure application of said tension means being movable through the pivotal support of said locking member, on pivotal movement of the locking member in said opposite direction, to releasably hold said latch out of a hook-closing position.

2. A coupling device including a body member having a hook portion adjacent one end open to one side of said body member and adapted to receive a hitch portion therein, a supporting member adjacent the other end of said body member and projected outwardly from said one side thereof, a pivoted latch, first axis means pivoting one end of said latch on said supporting member, a pivoted locking member, second axis means pivoting one end of said locking member on said supporting member, said latch and locking member being pivotally movable in one direction to positions at which said latch is in a hook-closing position substantially parallel with said one side of the body member, and said locking member is superposed on said latch in a substantially parallel relation with said latch, and a portion on said latch engageble with the free end of said locking member, at said moved positions, to lock said latch member against pivotal movement is an opposite direction away from a hook-closing position.

3. A coupling device including a body member having a hook portion at one end open to one side of said body member and adapted to receive a hitch portion therein, with the free end of said hook projected outwardly from the one side of said body member, a supporting member at the other end of said body member extended outwardly from said one side, a latch member pivoted at one end on said supporting member adjacent said one side and pivotally movable to a position substantially parallel to said one side and with the free end thereof extended across said hook opening to a position adjacent said hook free end, a locking member pivoted at one end on said supporting member at a position outwardly from the pivoted end of said latch for pivotal movement thereof to a position substantially parallel with and superposed on said latch member in a hook-closing position, and a projection on said latch member engageable with the free end of said locking member to retain said latch member against movement away from a hook-closing position.

4. A coupling device including a body member having a hook portion at one end open to one side thereof, with the free end of said hook projected outwardly from said one side and said hook adapted to receive a hitch portion therein below the level of said one side, an upright supporting member on said one side adjacent the other end of said body member, a latch member of straight form pivoted at one end on said supporting member and pivotally movable in one direction to a hook closing position against said one side and with the free end thereof extended across said hook opening adjacent to said hook free end, a locking member of straight form pivoted on said supporting member and pivotally movable in said one direction, when said latch is in a hook-closing position, to a position substantially parallel with said latch, and a projection on said latch engageable with the free end of said locking member, at said moved positions of the latch member and locking member, to lock said latch member against pivotal movement in an opposite direction away from a hook-closing position.

ERIC M. McELHINNEY.